Jan. 21, 1958
M. M. SCHMIDT
2,820,392
POWDER MEASURES
Filed July 6, 1953
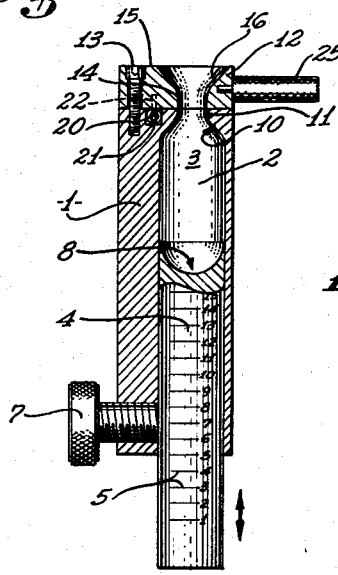
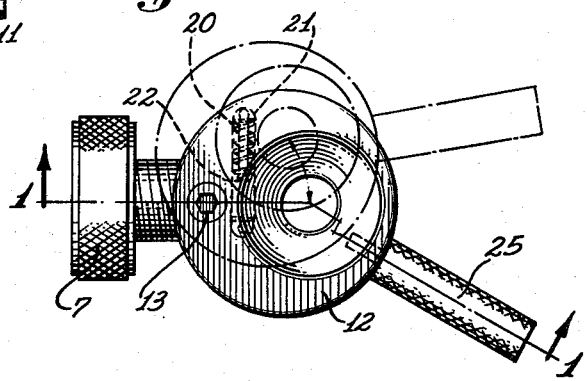
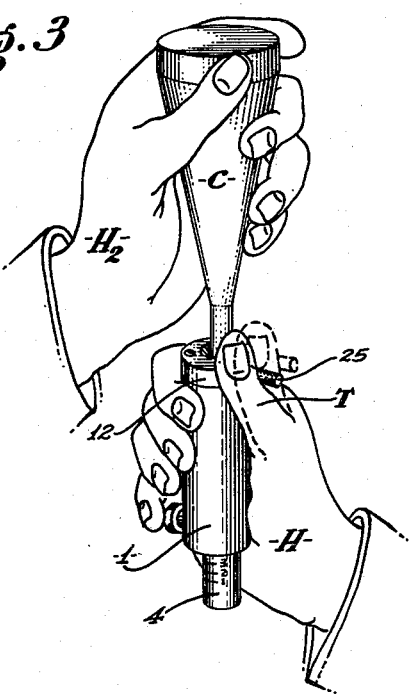
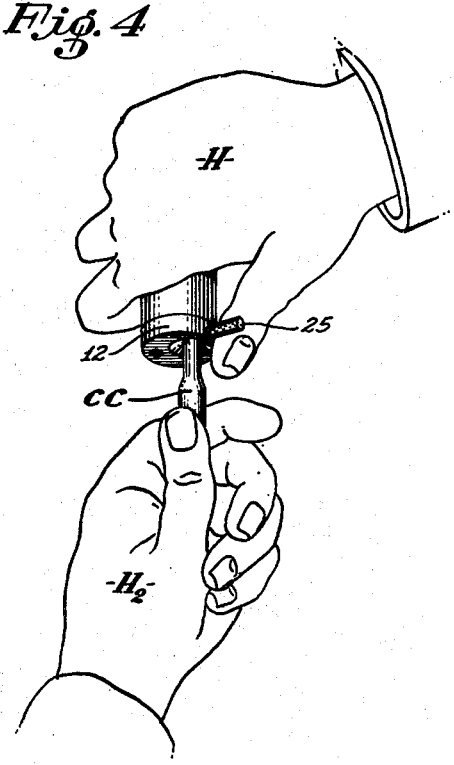
INVENTOR:
Marvin M. Schmidt
By Herbert E. Metcalf
His Patent Attorney United States Patent Office 2,820,392
Patented Jan. 21, 1958

2,820,392

POWDER MEASURES

Marvin M. Schmidt, Saugus, Calif.

Application July 6, 1953, Serial No. 366,245

3 Claims. (Cl. 86—33)

My invention relates to powder measures and more particularly to powder measures suitable for loading and reloading cartridge cases.

Among the objects of my invention are:

To provide a powder measure that is readily portable.

To provide an accurate powder measure that provides uniform powder charges.

To provide a powder measure permitting a visual check to prevent short charges.

To provide a powder measure construction minimizing powder retention.

And to provide a relatively simple and economical powder measure.

In brief, in one form, the present invention includes a body having an elongated cylindrical chamber therein, one end thereof being closed with a movable plug having a concave end in the chamber. Means are provided to hold the plug in predetermined positions to change chamber capacity. The opposite end of the chamber is provided with an inwardly directed feed cone dimensioned to receive the opening of a powder can and to receive the open end of cartridge cases of various sizes to be loaded, as for example, from .22 caliber to .45 caliber. Immediately below the feed cone a cutoff is positioned. The device is constructed to be readily filled with powder from a container and to fill a cartridge case while held in the hands alone, and thus is completely portable and usable in the field.

In the drawings, which will next be described,

Figure 1 is a longitudinal sectional view through one preferred form of my invention.

Figure 2 is an enlarged top plan view of the device of Figure 1.

Figure 3 is a perspective view of the measure of Figure 1 being charged with powder, and Figure 4 is a perspective view of the deposit of a powder charge in the measure into a cartridge case.

Referring first to Figures 1 and 2, a measure body 1 is provided with an offset internal bore 2 to provide a charge chamber 3 therein.

One end of chamber 3 is closed by a measuring plug 4 sliding smoothly in bore 2 and externally provided with measuring marks 5. Plug 4 is locked in place by thumb screw 7. The interior end of plug 4 is provided with a concave surface 8, preferably hemispherical in contour.

The other end of bore 2 is reduced by interior coned surface 10 to a smaller bore 11 at the top surface of body 1.

Rotatable on this top surface is a shear block 12, rotating on an offset pin 13 and provided with a shear block bore 14 registering in one position of shear block 12 with the smaller bore 11 in the body. Shear block 14 emerges at the outer surface 15 of the block 12 as an outwardly flaring funnel shaped throat 16.

Shear block 12 is positioned biased by a spring 20 inserted in a groove 21 cut in the top surface of body 1, one end of this spring bearing against block pin 22 extended downwardly into groove 21. It is preferred that the normal resting position of shear block 12 be where the smaller bore 11 of the body registers with the shear block bore 14, so that the chamber 3 is open to the exterior through the registering bores and funnel 16. Shear block 12 is readily rotatable to cutoff position by the use of thumb bar 25.

The action of the above described measure in use is shown in Figures 3 and 4.

First, the plug 4 is adjusted and locked in place to provide the desired powder charge in the charge chamber 3.

Then, the entire measure is held in one hand H, with a powder can C in the other hand $H_2$. Can C can be any conventional type of powder container. With the opening of the powder can up, the funnel 16 of the measure is placed over this opening and both are then inverted to the position shown in Figure 3, with a thumb T in position to contact thumb bar 25. Powder from can C will then run into chamber 3 of the measure. While holding the can and measure in this position, the two can readily be shaken, or tapped against another object, to insure complete filling of the charge chamber 3. The shear block 12 is then rotated by the thumb T to shear and cut off the charge, the can and measure being then again inverted to permit the unused powder to run back into the can C. With the funnel up, the shear block is then released. This action exposes the upper surface of the charge for visual inspection to make sure that no short charge exists in the measure.

The open end of a cartridge case CC is then placed in funnel 16 with the case opening up and funnel down, and both case CC and the measure are inverted to the position shown in Figure 4, whereupon the powder will run into the case CC. The case and measure can again be shaken or tapped to insure that all powder is transferred. Then, after the case CC and the measure have been separated, the chamber 3 can again be visually inspected to be sure that no powder has been retained in the measure. However, the use of the hemispherical surface 8 on plug 41 eliminates any lower corners in which powder grains could be retained by wedging, so that short charges are virtually eliminated. It is to be noted that in the measure described, it is not possible for retained powder to be added to the next charge to cause an overload, as the charge chamber is completely filled at each charge.

It is also to be noted that the smooth flowing lines of the throat adjacent the shear plane as shown in Figure 1, between the shear block 12 and the body 1, facilitate uniform filling as well as the free dropping of the measured charge into the case. Furthermore, the greatest charge irregularities occur at the shear plane referred to, and by reducing the wiping area at this plane the accuracy of the measure is appreciably increased.

While the powder measure of the present invention is particularly useful as a portable article for use in the field, it is well within the knowledge of those skilled in the art to mount the measure so that the advantages thereof can be obtained as a bench measure. Consequently I do not desire to be limited to a portable device.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A powder measure comprising: a body, an axial bore through said body defining a powder chamber therein, a measuring plug extending into one end opening of said bore and longitudinally and slidably movable in said chamber to change the capacity thereof, the end of said plug in said chamber being concavely shaped with the edge thereof forming a sharp circular edge circumscribing said plug end and slidably contacting the wall of said chamber, a plurality of measuring marks along the length of said measuring plug alignable with the bottom edge of said body around the opening of said chamber to indicate the capacity of said chamber as determined by the longitudinal position of said plug therein, screw means in said body engageable with the periphery of said plug to fasten said plug in capacity determining position in said body, a shear block rotatably attached over the opening at the end of said measuring chamber opposite said measuring plug, said shear block having a block bore therethrough, and spring means mounted in said body and operable to retain said shear block in a position where said block bore is coaxially registered with said powder chamber, said block being movable against the force of said spring to a position where said block closes the open end of said measuring chamber to confine a predetermined measure of powder in said chamber between said plug and said shear block.

2. Apparatus in accordance with claim 1 wherein said end opening of said powder chamber opposite said measuring plug and adjacent said shear block gradually converges to an opening smaller in diameter than the diameter of said chamber enclosed by said plug, and wherein said block bore has a diameter of substantially the same size as said smaller diameter end opening of said chamber.

3. Apparatus in accordance with claim 2 wherein said block bore is cone shaped to provide a charging funnel, said funnel being tapered and sized to receive open ends of cartridge casings of various diameters.

References Cited in the file of this patent

UNITED STATES PATENTS

| | | |
|---|---|---|
| 2,426,898 | Paldani | Sept. 2, 1947 |
| 2,574,727 | Burkett | Nov. 13, 1951 |
| 2,633,771 | Crandall | Apr. 7, 1953 |

FOREIGN PATENTS

| | | |
|---|---|---|
| 15,287 | Sweden | Sept. 10, 1901 |